United States Patent [19]

Fujii

[11] Patent Number: 5,065,955
[45] Date of Patent: Nov. 19, 1991

[54] TAPE CASSETTE HAVING OUTER AND INNER LIDS LOCKED BY THE INNER LID

[75] Inventor: Hiroshi Fujii, Tokyo, Japan

[73] Assignee: Sony Corporation, Tokyo, Japan

[21] Appl. No.: 599,304

[22] Filed: Oct. 17, 1990

[30] Foreign Application Priority Data

Nov. 6, 1989 [JP] Japan .................................. 1-289670

[51] Int. Cl.$^5$ .............................................. G11B 23/00
[52] U.S. Cl. ..................................... 242/198; 360/132
[58] Field of Search ............... 242/197, 198, 199, 200;
220/334; 360/132; 206/387, 389

[56] References Cited

U.S. PATENT DOCUMENTS

| | | | |
|---|---|---|---|
| 4,418,373 | 11/1983 | Fujimori et al. | 242/199 |
| 4,556,153 | 12/1985 | Takagi et al. | 242/198 X |
| 4,607,308 | 8/1986 | Tsuruta et al. | 242/197 X |
| 4,646,191 | 2/1987 | Goto | 242/199 X |
| 4,658,981 | 4/1987 | Goto et al. | 242/198 X |
| 4,672,497 | 6/1987 | Ueda | 242/198 X |
| 4,680,660 | 7/1987 | Ueda | 242/199 X |
| 4,698,713 | 10/1987 | Kawada | 242/198 X |
| 4,844,377 | 7/1989 | Shiomi et al. | 242/198 |
| 4,893,766 | 1/1990 | Yamashira et al. | 242/198 |
| 4,898,338 | 2/1990 | Oishi | 242/198 |

FOREIGN PATENT DOCUMENTS 63-175279  7/1988  Japan .................................. 360/132

Primary Examiner—Joseph J. Hail, III
Assistant Examiner—John P. Darling
Attorney, Agent, or Firm—Philip M. Shaw, Jr.

[57] ABSTRACT

A tape cassette of the type having front and back lids for covering front and rear sides of a portion of the cassette tape which passes outside of the cassette casing is further provided with a locking element for locking the front and back lids closed when the cassette is not being used.

8 Claims, 13 Drawing Sheets

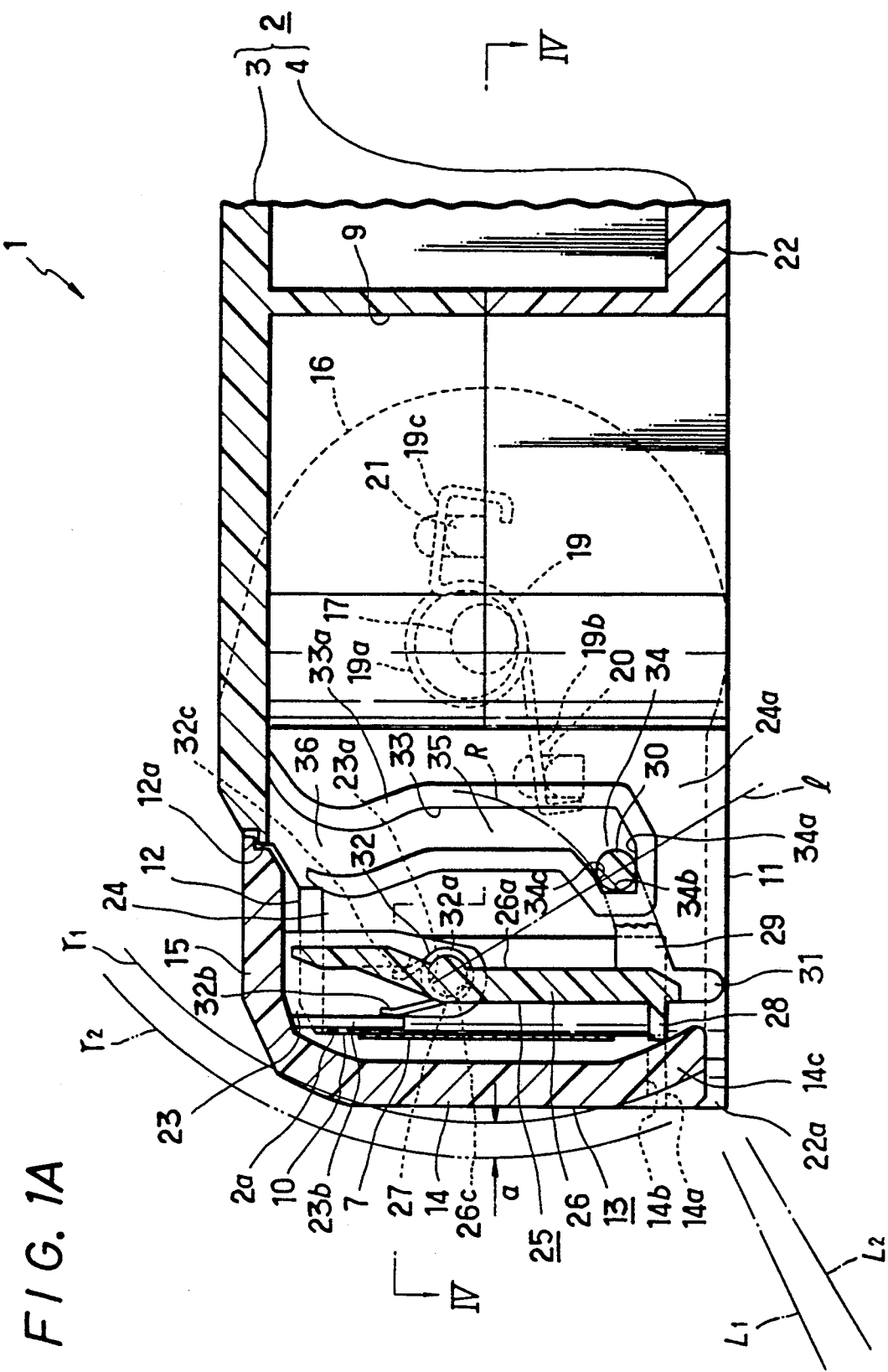

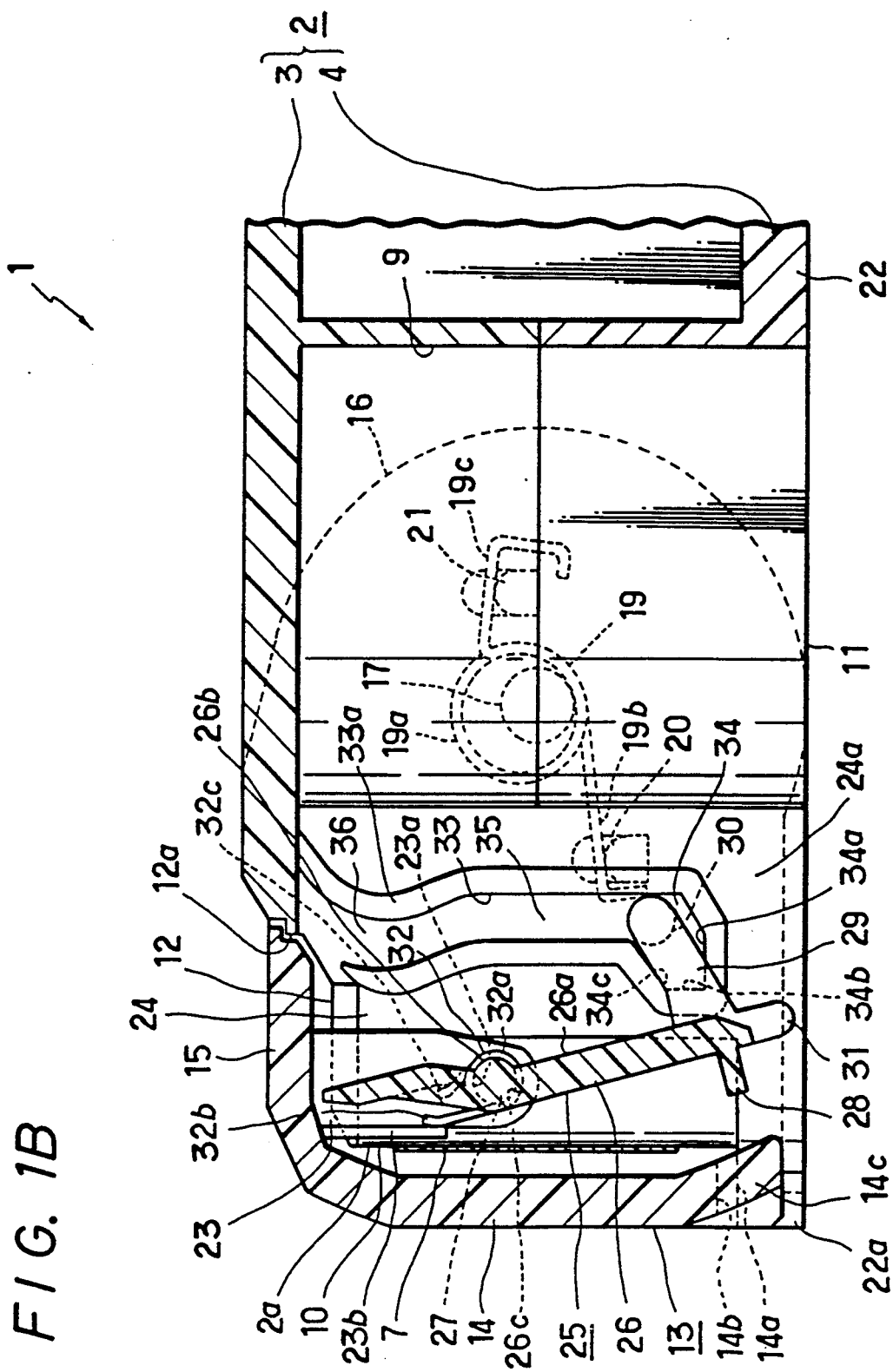

TAPE CASSETTE HAVING OUTER AND INNER LIDS LOCKED BY THE INNER LID

BACKGROUND OF THE INVENTION

1. Field of the Invention

The present invention generally relates to tape cassettes and, more particularly, to a tape cassette having front lid and a back lid for covering the tape inside the cassette when it is not in use and which are opened during use to allow the tape to be withdrawn to the outside of a cassette casing so that one portion of the tape extends along a tape withdrawing area between tape exit portions formed at two ends of a front wall of the cassette casing.

2. Description of the Prior Art

In one type of tape cassette utilizing a record medium tape, for example, a magnetic tape, a front lid is rotatably attached to the cassette casing so that the front lid is movable between a lid closed position for covering the front wall of the cassette casing, and a lid opened position for exposing the front wall. The front lid functions to protect the tape, which extends along the front wall of the cassette casing, from dust and from being touched by fingers and the like. The front lid is commonly comprised of a main portion which covers the front wall of the cassette casing. Supported portions protrude from left and right ends of the main portion, wherein the supported portions are rotatably supported by the left and right side wall portions of the cassette casing.

A conventional tape cassette is provided with a tape withdrawing recess portion opened in the front and lower directions in order to place a tape withdrawing member behind the tape when the tape cassette is loaded on the recording and/or reproducing apparatus. The tape withdrawing recess portion is formed between two tape exit portions provided at left and right end portions of the front wall of the cassette casing. Further, in order to protect the tape from being touched with fingers or the like entered through the tape withdrawing recess portion, a conventional tape cassette is provided with a back lid which covers the tape from the rear side independently from the front lid.

Because the front lid functions to protect the tape when the tape cassette is not in use, the front lid must be locked in the lid closed position. To this end, this type of tape cassette is generally provided with a locking device which locks the front lid in the lid closed position. In the prior-art tape cassette, one side end portion of the front lid, for example, one of the left and right supported portions is locked by the locking device. Japanese Utility Model Published Gazette No. 63-1606 describes a tape cassette having such a locking device.

However, with respect to the configuration of the tape cassette, the dimension in the left to right direction is large compared to the thickness, as seen from the front wall side. Accordingly, the main portion of the front lid is generally shaped in a narrow rectangular configuration that is long in the left to right direction. Therefore, the mechanical strength of the front lid against deformation is decreased. As a result, if the other side end portion of the front lid is pushed in the lid opening direction, without releasing the front lid from its locked state, the other side end portion of the front lid is displaced while the front lid is twisted, exposing one portion of the tape to the outside. Further, there is the substantial disadvantage that the front lid will be deformed or the front lid will be damaged.

In order to remove the above-mentioned shortcomings and disadvantages, it is proposed that the thickness of the front lid be increased or that the front lid be locked at its left and right side portions. According to this proposal, the weight of the tape cassette is increased or the number of locking devices is increased, which unavoidably increases the number of assembly parts of the tape cassette. Further, another problem is that the number of lock releasing devices provided in the recording and/or reproducing apparatus must be increased in order to release the locking devices.

OBJECTS AND SUMMARY OF THE INVENTION

Accordingly, it is an object of the present invention to provide an improved tape cassette which can substantially eliminate the aforenoted shortcomings and disadvantages encountered with the prior art.

More specifically, it is an object of the present invention to provide a tape cassette in which a front lid can be prevented from being easily displaced in the lid opening direction.

Another object of the present invention is to provide a tape cassette in which the mechanical strength of the front lid is considerably increased, preventing the front lid from being easily deformed.

Still another object of the present invention is to provide a tape cassette in which a lid closed condition can be stably maintained.

A further object of the present invention is to provide a tape cassette which does not need a special locking member.

Yet a further object of the present invention is to provide a tape cassette which is simplified in structure.

In accordance with an aspect of the present invention, a tape cassette is provided, in which a tape is withdrawn to the outside of a cassette casing. One portion of the tape is extended along a tape withdrawing area, formed between tape exit portions located at two end portions of a front wall of the cassette casing. This tape cassette is comprised of a front lid rotatably attached to the cassette casing so as to cover the whole area of the front wall of the cassette casing, and a back lid rotatably attached to the front lid so as to cover one portion of the tape from its rear side. When the tape cassette is not in use and the front and back lids are placed in their lid closed positions, the tape is covered with the front and back lids from the front and rear sides. This tape cassette is characterized by a locking member which locks the back lid in the lid closed position when the tape cassette is not in use.

Thus, in the tape cassette of the present invention, a locking member locks the front and back lids in the lid closed positions, so that, without increasing the thickness of the front lid, the mechanical strength of the front lid to resist deformation is increased. Therefore, the lid closed condition can be maintained stably and the front lid can be prevented from being deformed.

These and other objects, features and advantages of the tape cassette according to the present invention will become apparent from the following detailed description of the preferred embodiments taken in conjunction with the accompanying drawings, throughout which like reference numerals designate like elements and parts in the several views.

BRIEF DESCRIPTION OF THE DRAWINGS

The accompanying drawings show the preferred embodiments of the present invention. FIGS. 1A-6 illustrate a first embodiment of the tape cassette according to the present invention.

FIGS. 1A-1C are fragmentary, enlarged, longitudinal cross-sectional views of a main portion of a first embodiment of a tape cassette according to the present invention. Reference will be made to these figures in explaining the movements of front and back lids from their closed positions to their opened positions with the passage of time.

FIG. 2 is an enlarged, perspective view of the first embodiment of the tape cassette according to the present invention with its front and back lids closed.

FIG. 3 is an enlarged, perspective view of the first embodiment of the tape cassette according to the present invention with its front and back lids opened.

FIG. 4 is an enlarged, cross-sectional view taken through the line IV—IV in FIG. 1A, illustrating the first embodiment of the tape cassette. Sections of the cassette have been omitted for simplicity.

FIG. 5 is an enlarged, perspective, exploded, bottom view illustrating the first embodiment of the tape cassette according to the present invention.

FIG. 6 is an enlarged, partial-cutaway, perspective view of the back lid and the front lid, illustrating, particularly, two end portions of the back lid and a supporting portion of the front lid.

FIGS. 7-10B show a second embodiment of the tape cassette according to the present invention.

FIG. 7 is an enlarged, perspective view of the second embodiment of the tape cassette according to the present invention, in which the front and back lids are closed.

FIG. 8 is an enlarged, perspective view of the second embodiment of the tape cassette according to the present invention, in which the front and back lids are opened.

FIG. 9 is an enlarged, exploded perspective view of the front lid, the back lid and a lock member of the second embodiment of the tape cassette according to the present invention.

FIG. 10B is an enlarged, fragmentary, longitudinal cross-sectional view of the second embodiment of the tape cassette according to the present invention, in which the front and back lids are opened.

DETAILED DESCRIPTION OF THE PREFERRED EMBODIMENTS

Figure 1C:
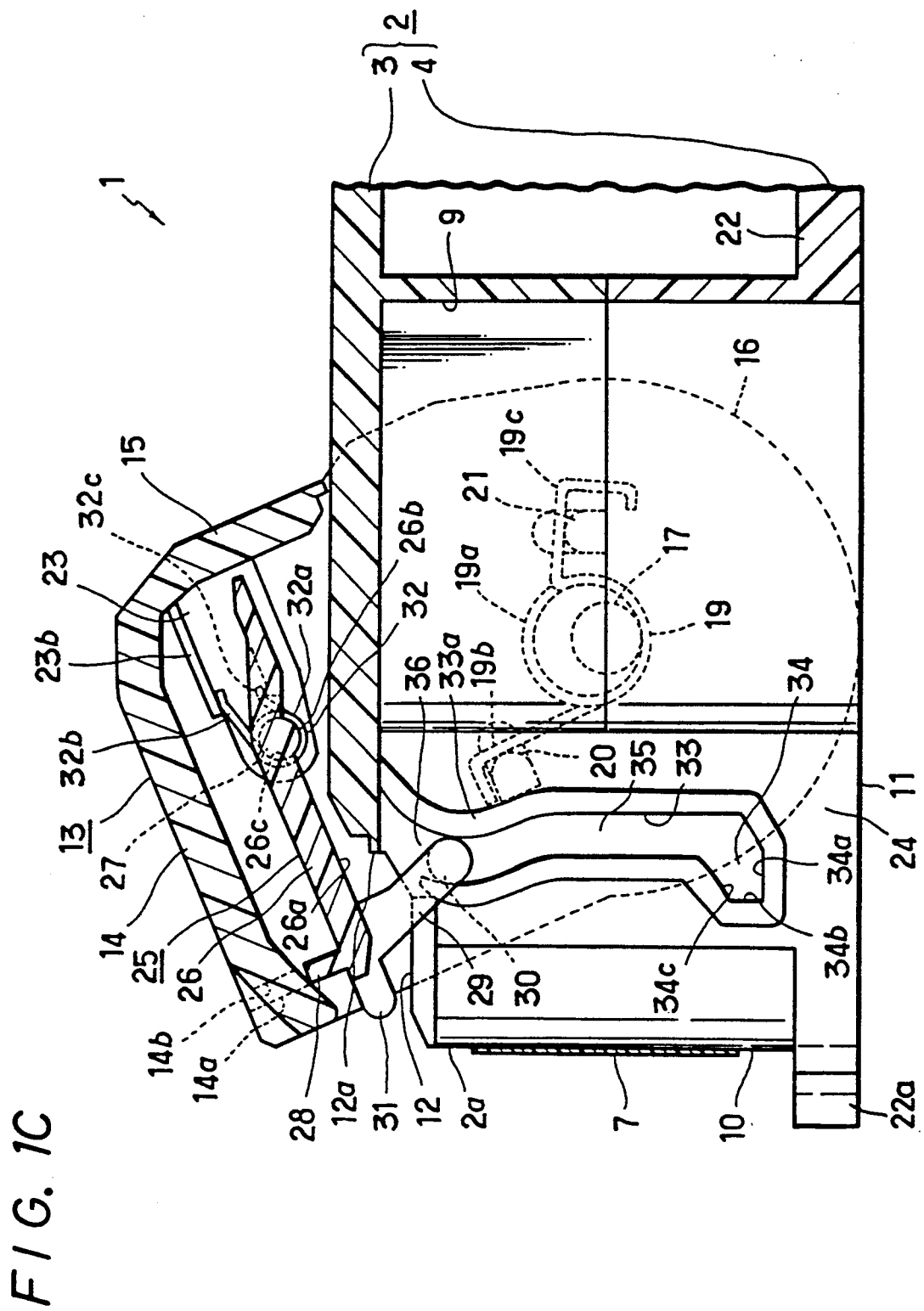

The present invention will now be described in detail with reference to the accompanying drawings. FIGS. 1A-6 show a first embodiment of the tape cassette according to the present invention. Initially, a cassette housing or casing of this tape cassette will be described with reference to FIGS. 1A-5.

As illustrated, a tape cassette is provided which is generally designated by reference numeral 1. A cassette casing 2 of the tape cassette 1 is shaped substantially as a planar, rectangular thin box and is generally comprised of an upper half or upper part 3 and a lower half or lower part 4. The cassette casing 2 has a substantially rectangular shallow-shaped configuration and is made of a synthetic resin. The upper part 3 and the lower part 4 are secured together by a suitable means such as screws (not shown) or the like.

Figure 2:
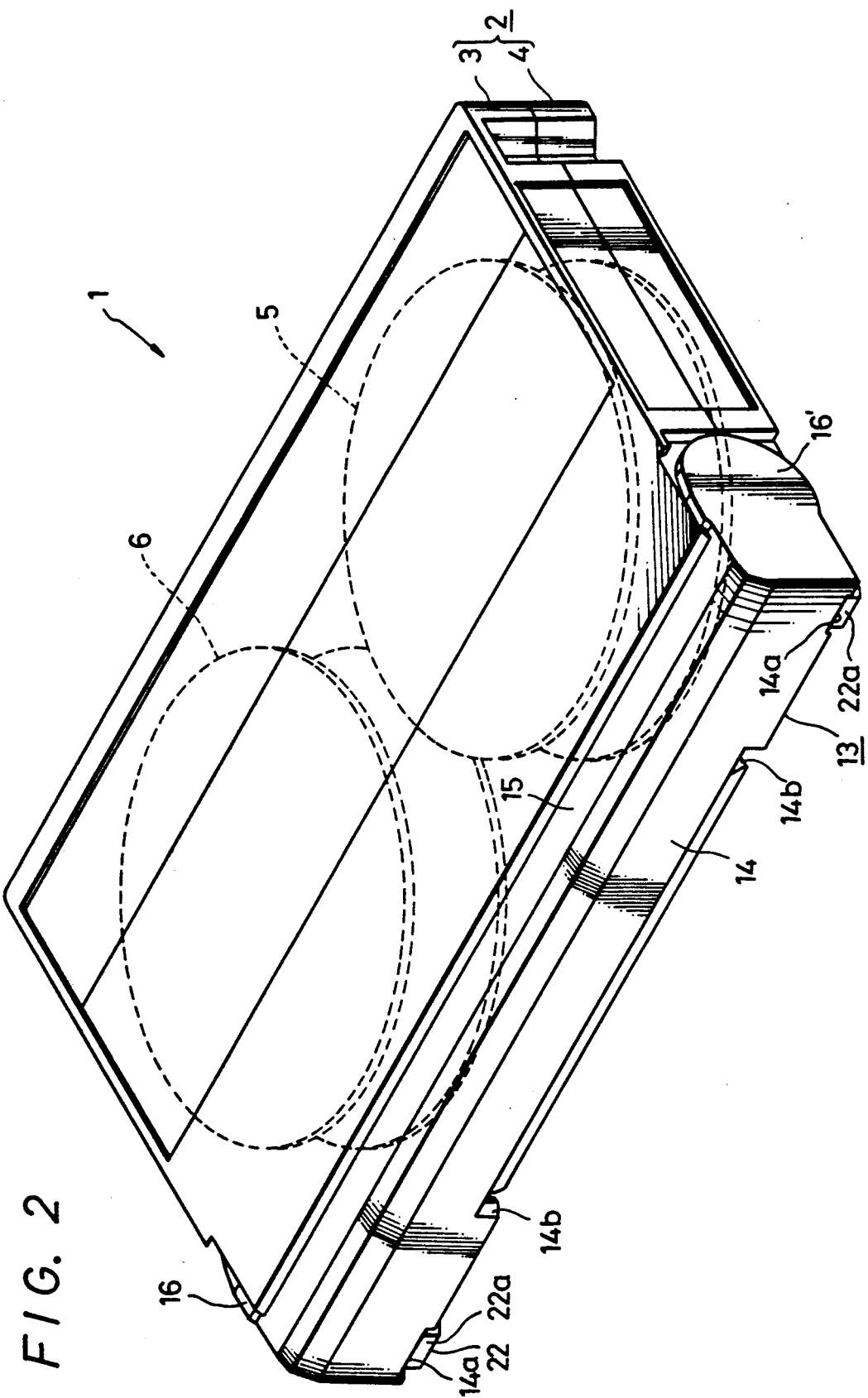
Figure 3:
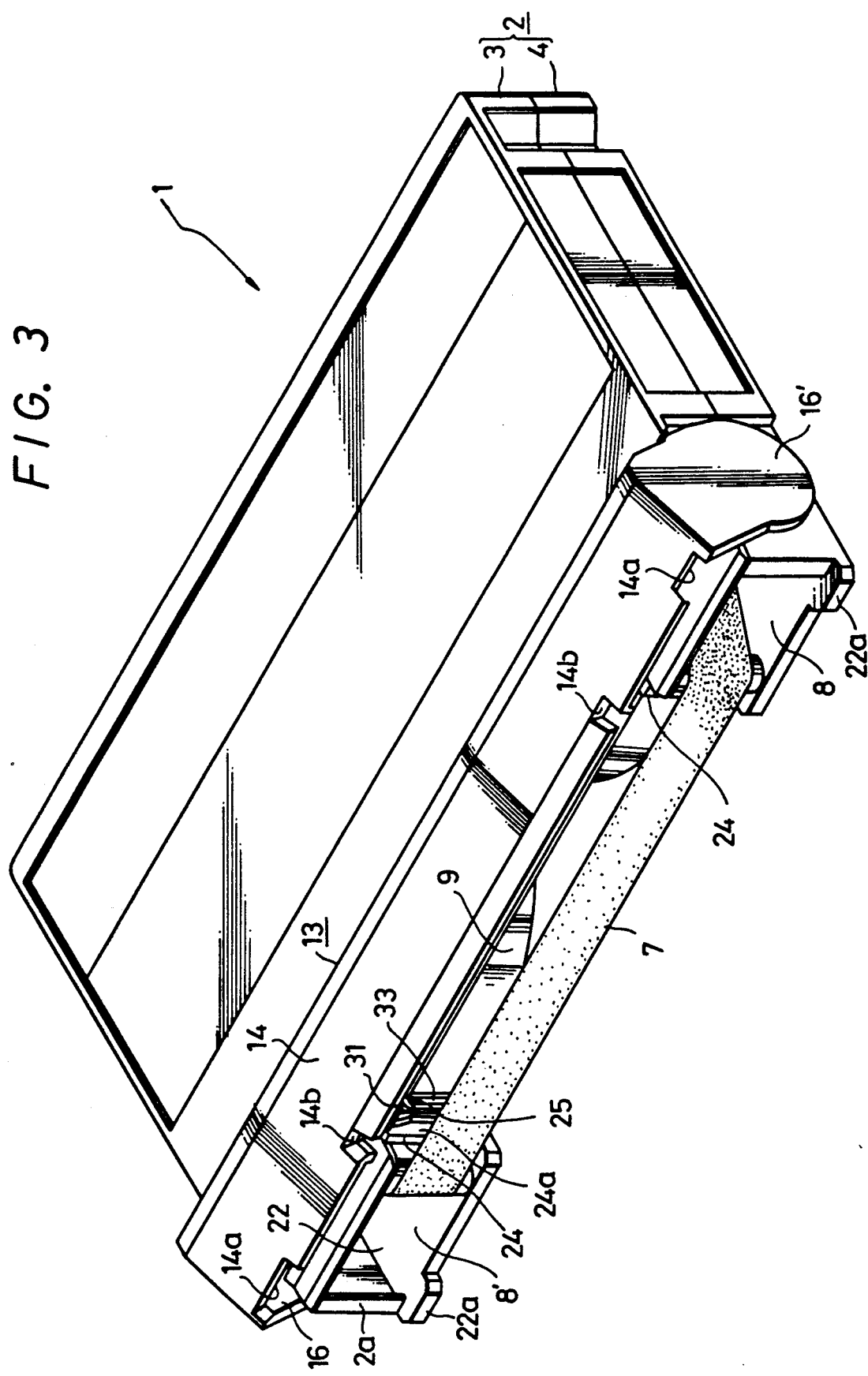

As shown in FIG. 2, a pair of tape reels 5 and 6 are rotatably accommodated within the cassette casing 2, and a magnetic tape 7, as shown in FIG. 3, is wrapped around the pair of tape reels 5 and 6.

As illustrated in FIG. 3, tape exit portions 8 and 8', respectively, are provided at right and left end portions of a front wall 2a of the cassette casing 2. The magnetic tape 7 supplied from one tape reel 5 is withdrawn from the tape exit portion 8 to the outside of the cassette casing 2. Then, the magnetic tape 7 travels along a portion between the tape exit portions 8 and 8' (this portion will be referred to hereinafter as the "tape withdrawing area"). The tape 7 then enters the cassette casing 2 from the other tape exit portion 8', finally winding around the other tape reel 6.

Figure 5:
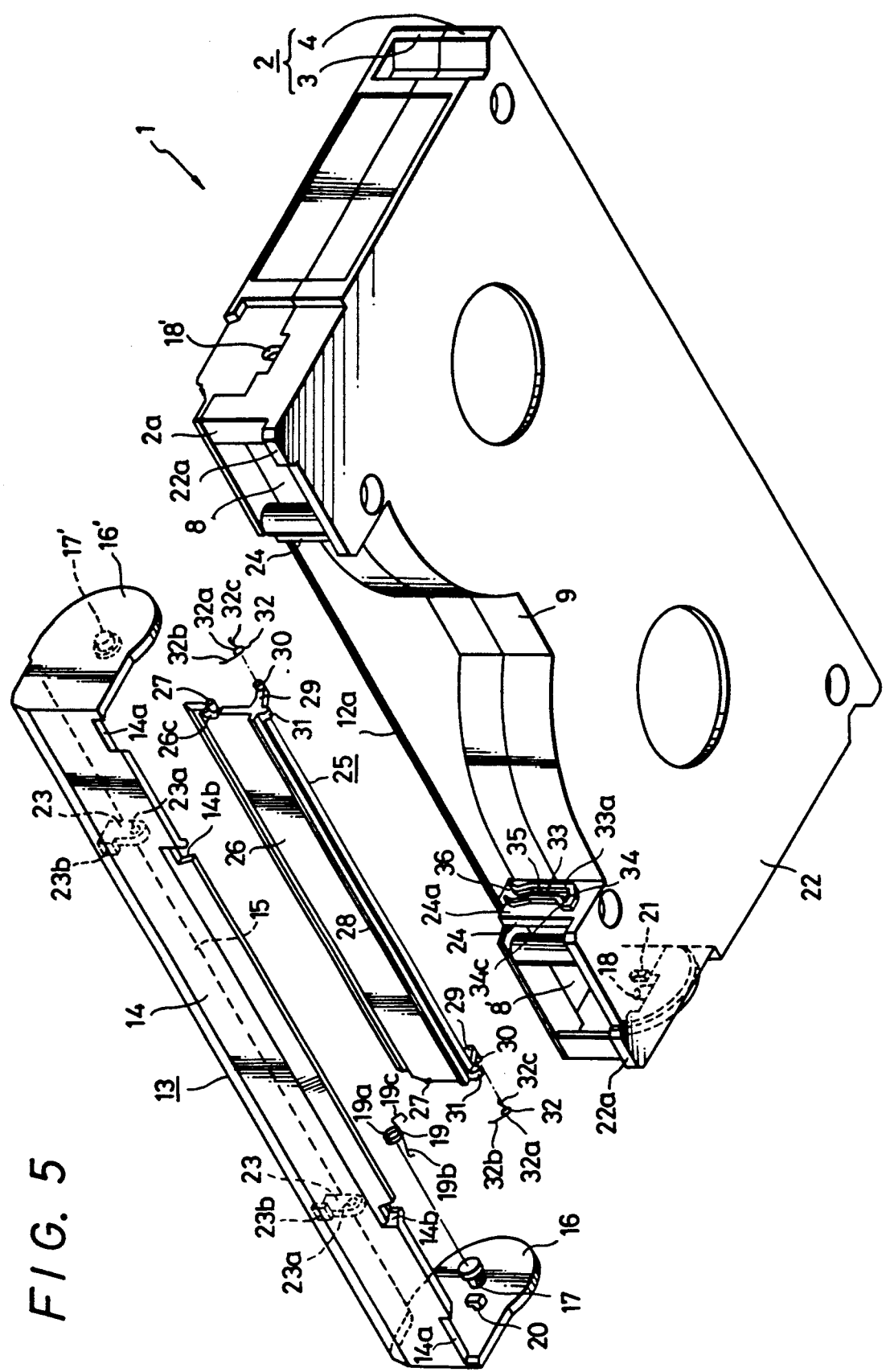

A tape withdrawing recess portion 9 is formed in the above-mentioned tape withdrawing area along the front wall 2a portion of the cassette casing 2. The tape withdrawing recess portion 9 has a front surface 10, a lower surface 11 and an upper surface 12, as shown in FIGS. 1A-1C. The depth of the upper opening surface 12 is small compared to the lower opening surface 11. A rear edge 12a of the upper opening surface 12 extends in the left to right direction in a straight line fashion, as shown in FIG. 5.

Other configurations and structures of the cassette casing 2 will be described more fully later.

An outer or front lid will be described with reference to FIGS. 1A-6.

As illustrated, an outer or front lid 13 is made of a synthetic resin and covers the whole area of the front wall 2a of the cassette casing 2. The front lid 13 is comprised of a front wall portion 14, an upper wall portion 15 protruding rearward from the upper edge of the front wall portion 14, and side wall portions 16, 16' protruding rearward from the left and right side edges of the front wall portion 14. The front lid 13 is unitarily formed by a molding-process of a synthetic resin.

Figure 4:
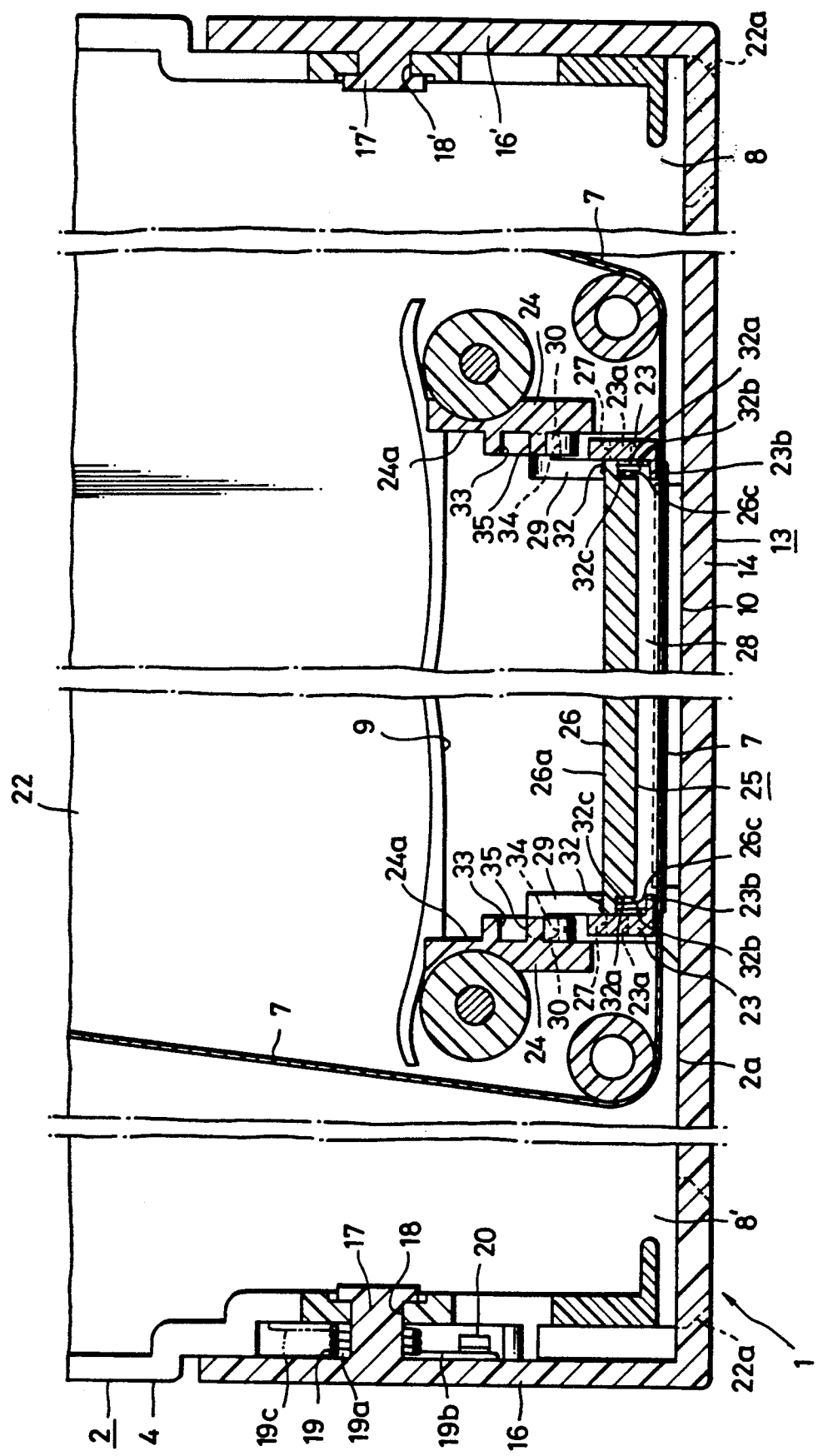

As shown in FIGS. 4 and 5, support pins 17 and 17' are implanted on the inside surfaces of the side wall portions 16 and 16'. The pins are substantially centrally positioned relative to the upper to lower direction, near the rear of their respective side wall portions. The support pins 17 and 17' are rotatably supported by support apertures 18 and 18' formed through the side portions of the cassette casing 2 near the front ends, whereby the front lid 13 is rotatably supported by the cassette casing 2 in such a fashion that the front lid 13 is rotated between the closed position, in which the front wall portion 14 of the front lid 13 covers the front wall 2a of the cassette casing 2, as shown in FIG. 2, and the opened position, in which the front wall portion 14 is located on the upper side of the front wall 2a exposing the front wall 2a as shown in FIG. 3.

As illustrated, a torsion spring 19 is provided to urge the front lid 13 to rotate in the lid closing direction. The torsion spring 19 is comprised of a spring coil portion 19a and two spring arm portions 19b and 19c which separately extend from the two ends of the spring coil portion 19a. The spring coil portion 19a is engaged with the support pin 17 between the front lid left side wall portion 16 and the cassette casing 2. In the foregoing, the "left-hand direction" means the left-hand direction when viewing the front wall of the tape cassette 1. As best shown in FIG. 1A, one spring arm portion 19b comes in downward, resilient contact with a spring contact portion 20 which protrudes from the inside surface of the side wall portion 16 between the front wall portion 14 side and the support pin 17. The other spring arm portion 19c comes in downward, resilient contact with a spring contact portion 21 which protrudes from the left side surface of the cassette casing 2. Thus, the torsion spring 19 urges the front lid 13 to rotate in the counter-clockwise direction as seen from the right-hand side, i.e. the lid closing direction.

Left and right end portions 22a of the front end of a bottom plate portion 22 of the cassette casing 2 protrude slightly forward from the front wall 2a of the cassette casing 2. Further, shallow recesses 14a are formed on the lower side edge of the front surface portion 14 of the front lid 13 so that, when the upper side edges of the recesses 14a and 14b come in downward contact with the protruding portions 22a, the front lid 13 is inhibited from excessively rotating in the counter-clockwise direction. A back lid 25 inhibits the rotation of the front lid 13, when the front lid is in the closed position.

Therefore, when the front lid 13 is in the closed position (this condition will be referred to hereinafter as "lid closed condition"), the whole area of the front wall 2a of the cassette casing 2 is covered by the front surface portion 14 of the front lid 13, and the upper surface opening 12 of the tape withdrawing recess portion 9 is covered by the upper surface portion 15 of the front lid 13. Accordingly, the magnetic tape 7 which extends along the tape withdrawing area of the front wall 2a of the cassette casing 2, is covered at its front surface side and upper portion by the front lid 13.

As best shown in FIGS. 1C and 5, support members 23 are provided to support the back lid 25 which will be described later. These support members 23 extend downward from the undersurface of the upper surface portion 15 of the front lid 13. The lower ends of these support members 23 extend to a position slightly above the center of the front lid 13 in its upper to lower direction. In the left to right direction of the front lid 13, the lower ends of the support members 23 are located at the positions corresponding to opposing inner side surfaces 24a of walls 24 located at left and right inside surfaces of the tape withdrawing recess portion 9. These positions are between the tape withdrawing recess portion 9 and the tape exit portions 8 and 8'. Circular support apertures 23a are bored through the lower end portions of the support members 23. Spring contact portions 23b protrude inward from the upper portions of the front side edges of the support members 23. The inner or back lid 25 will be described with reference to FIGS. 1A–1C and FIGS. 3–6.

As illustrated, the back lid 25 covers the rear and lower sides of the magnetic tape 7. Portions of the back lid 25 are formed by a molding-process of a synthetic resin.

Figure 6:
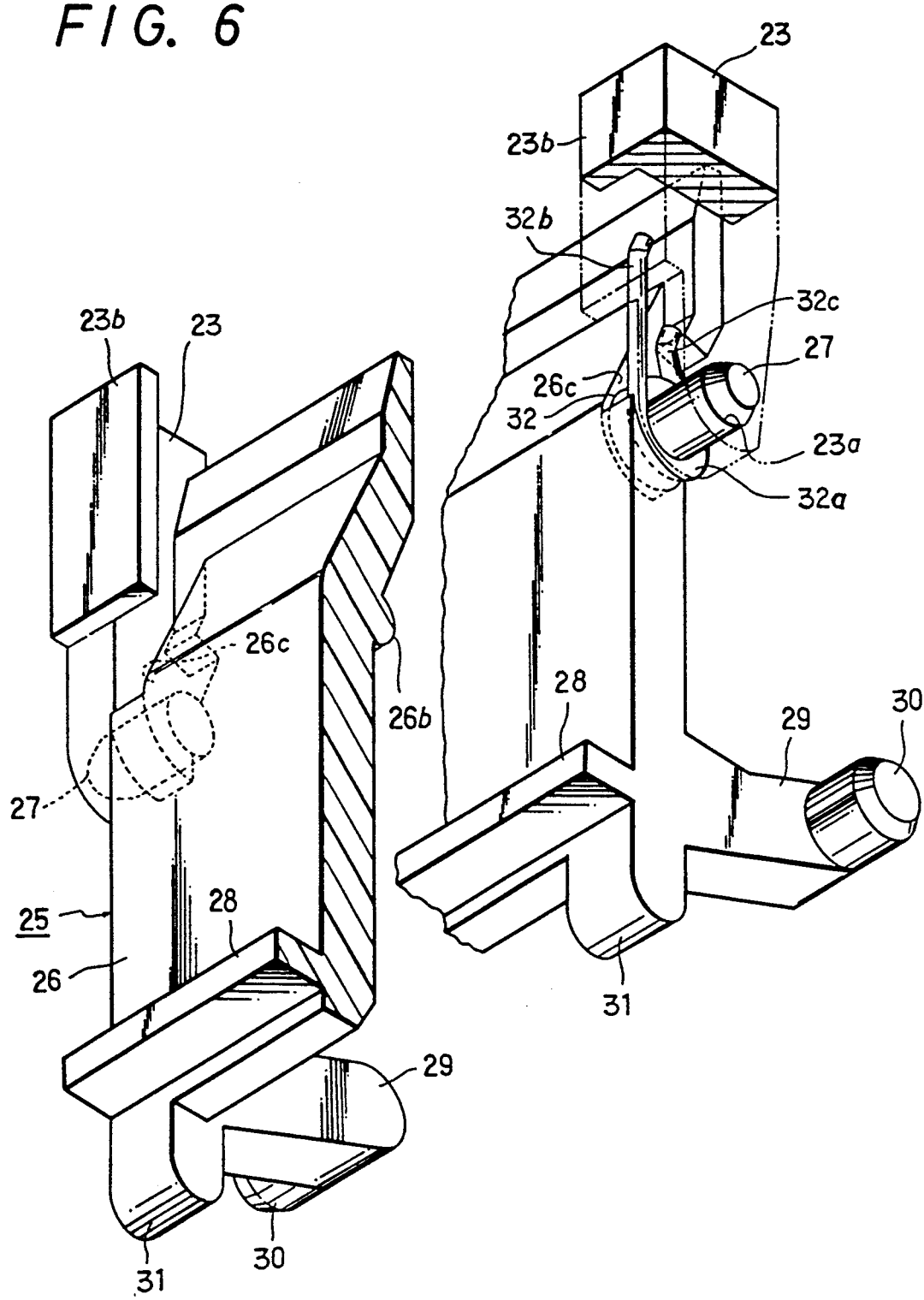

A main portion 26 of the back lid 25 is shaped as a rectangular plate, long in the left to right direction. The main portion 26 has a length substantially the same as the spacing between the two support members 23 of the front lid 13. The back lid main portion 26 has an upper to lower width that is slightly smaller than the upper to lower width of the front surface portion 14 of the front lid 13. The back lid 25 has a protruding portion 26b which has an arc-shaped configuration in transversal cross section, as shown in FIG. 6. Portion 26b protrudes from the back lid rear wall 26a at a position slightly above the center in the width direction. The back lid main portion 26 is substantially V-shaped in cross-section above the protruding portion 26b, as viewed from the left.

Recesses 26c are respectively formed on the back lid main portion 26 at positions corresponding to the protruding portion 26b. The recesses are in the left and right side end faces of the main portion 26. Two coaxial support pins 27 protrude from the side surfaces of the recesses 26c.

An outwardly jutting lip 28 along the lower side edge of the front surface of the main portion 26 of the rear door 25, extending in the left to right direction. Relatively short arm members 29 protrude rearward from the lower ends of the left and right ends of the main portion 26 of the back lid 25. Guided pins 30 of small columnar-shaped configurations, protrude from the rear portions of the arm members 29 in the lateral direction.

Downwardly extending bosses 31 protrude from the left and right end portions of the main portion 26. The height between the lower surface of the bosses 31 and the upper surface of the main portion 26 is made very slightly smaller than the height between the lower edge of the front surface portion 14 of the front lid 13 and the undersurface of its upper surface portion 15.

The support pins 27 are inserted into the support apertures 23a formed through the support members 23 of the front lid 13, whereby the back lid 25 is rotatably supported by the front lid 13 at a position behind the front surface portion 14 of the front lid 13. Further, the guided pins 30 are slidably engaged with guide grooves (which will be described later) formed in the side walls of the cassette casing 2, whereby the back lid 25 is movable between the lid closed position shown in FIG. 1A, and the lid opened position shown in FIG. 1C, in unison with the rotation of the front lid 13.

Torsion springs 32 urge the back lid 25 to rotate in the direction in which the lower end portion of the back lid 25 approaches the front lid 13. The torsion springs 32 are comprised of spring coil portions 32a and two spring arm portions 32b and 32c which separately extend from the two ends of the spring coil portions 32a. The spring coil portions 32a are engaged with the support pins 27 at positions between the main portion 26 and the support members 23. Spring arm portions 32b are in resilient contact at their free ends, with the spring contact portions 23b of the support members 23 from the rear direction. The other spring arm portions 32c are in resilient contact at their tip ends, with the front surface of the main portion 26 at positions which are continuous with the upper side surfaces of the recesses 26c from the front side.

Thus, the back lid 25 is urged to rotate in the clockwise direction, as seen from the right-hand direction, by the torsion springs 32.

The guide grooves 33 will be described next with reference to FIGS. 1A–1C and FIGS. 3–5.

As illustrated, guide grooves 33 guide the movement of the guided pins 30, thereby controlling the attitude of the back lid 25 relative to the front lid 13. In addition to the above-mentioned guide function, the guide grooves 33 have a locking function to lock the back lid 25 at the lid closed position. Portions 33a protrude from the inside surfaces 24a of the cassette casing walls 24 forming the guide grooves 33.

The guide grooves 33 are comprised of initial guide portions 34, forming the lower end portions thereof, succeeding intermediate portions 35 and succeeding final guide portions 36. The initial guide portions 34 are substantially flush with the lower side edge of the magnetic tape 7 extended along the tape withdrawing area of the front wall 2a of the cassette casing 2. Also, the initial guide portions 34 are formed so as to extend substantially along a rotational loci of the guided pins 30 of the back lid 25 when the front lid 13 is in the lid closed position. The intermediate portions 35 continuously extend upward in a substantially straight line fashion from the rear end portions of the initial guide portions 34. Further, the final guide portions 36 extend, in the form of a gentle arc in the clockwise direction as seen from the right hand side, from the upper ends of the intermediate portions 35. The upper ends of the final guide portions 36 are open at substantially the same level as the tops of the walls 24.

The guided pins 30 of the back lid 25 are slidably engaged with the guide grooves 33, resulting in the movement of the guide pins 30 being defined by the guide grooves 33.

The locking function of the guide grooves 33 for locking the back lid 25 will be described in a later stage. As earlier noted, the lower end portion of the back lid 25 is urged to approach the front lid 13. The initial guide portions 34 of the guide grooves 33 extend substantially along a rotational loci of the guided pins 30 when the back lid 25 is in the lid closed condition. When the front lid 13 is in the lid closed position, as shown in FIG. 1A, the guided pins 30 come in resilient contact with substantially horizontal inner bottom surfaces 34a of the initial guide portions 34 and their front side surfaces 34b, which are substantially vertical to the inner bottom surfaces 34a, thereby preventing the back lid 25 from being excessively rotated in the above-mentioned direction.

The position of the back lid 25 in this state is the lid closed position. Under this condition, the back lid's main portion 26 opposes the front surface of the front wall portion 14 across the magnetic tape 7, so that the two lids are in a substantially parallel relationship. Also, the front end face of the rectangular cover portion 28 is located slightly below the lower edge of the magnetic tape 7 and comes in slight contact with, or approaches very close to, the rear surface of the front surface portion 14 of the front lid 13.

Therefore, in the lid closed state, the front and top of the magnetic tape 7 are covered by the front lid 13. Also, the back and bottom of the magnetic tape 7 are covered by the back lid 25.

In the lid closed state, the back lid 25 is inhibited from moving toward the lid opened position. That is, the back lid 25 is locked in the lid closed position. Therefore, since the lids are substantially locked together, the front lid 13 is also locked in the lid closed position.

The above-mentioned locking operations are affected by the initial guide portions 34 of the guide grooves 33 and the spring forces of the springs 32.

More specifically, in FIG. 1A, a straight line $L_1$ represents an extension line of the upper surfaces 34c (these upper surfaces 34c will be referred to hereinafter as "locking surfaces") of the initial guide portions 34 of the guide grooves 33. A curve R represents a rotational locus of the outer peripheral surfaces of the guided pins 30 at their portions which contact the locking surfaces 34c when the back lid 25 is in the lid closed condition. Further, a straight line l connects the centers of the guided pin 30 and the support pin 27. A straight line $L_2$ is tangent to the rotational locus R at the point where the straight lines l and the rotational locus R cross each other. The locking surfaces 34c are formed so as to extend in the direction slightly inclined to the rearward relative to line $L_2$. In FIG. 1A, the locking surfaces 34c are shown to be inclined by approximately 5 degrees relative to line $L_2$.

Accordingly, when force is applied to the front lid 13 urging it to open, such force is also applied to the back lid 25. Since the back lid 25 is urged to rotate by the springs 32, the guided pins 30 are urged to rotate in the lid opening direction by the force which is always urged against the locking surfaces 34c in substantially the same direction as the direction defined by the straight line l. Then, since the locking surfaces 34c have the inclined angles described above, the guided pins 30 are urged against the locking surfaces 34c, so that the guided pins 30 are inhibited from moving in any direction. Thus, the back lid 25 is inhibited from being moved in the lid opening direction, whereby the front lid 13 is also inhibited from moving in the lid opening direction. Therefore, the back lid 25 and the front lid 13 are both locked in their lid closed positions.

The front lid 13 is locked by its two support members 23 which are coupled to the back lid 25. The front lid support members 23 are located toward the center from the left and right ends so that, even when the front lid 13 is pushed toward the lid opening direction from the lid closed condition, the front lid 13 is hardly twisted thereby. Accordingly, there is no substantial risk that one portion of the front lid 13 will be displaced in the lid opening direction causing the magnetic tape 7 to be exposed or the front lid 13 to be deformed.

For example, when the dimension of the front lid 13 is relatively small in the left to right direction, the back lid 25 may be locked at one place, if necessary. In other words, the locking surface 34c may be formed only in one initial guide portion 34 of the two guide grooves 33. According to this modification, the position at which the back lid's locking force acts on the front lid 13, is located substantially toward a central position relative to the side end portions of the front lid 13, increasing the front lid's mechanical strength against twisting.

It is sufficient that one of the springs 32 urges the back lid 25 to rotate. Further, this spring 32 may be unitarily formed with the back lid 25.

The front lid 13 and the back lid 25 are moved in the lid opening direction by a lid opening device provided in a recording and/or reproducing apparatus (not shown) when the tape cassette 1 is loaded into the recording and/or reproducing apparatus.

More specifically, the recesses 14b are formed on the lower end portion of the front surface portion 14 of the front lid 13 at positions corresponding to the bosses 31 of the back lid 25 in the lid closed position. Therefore, when the tape cassette 1 is inserted into a cassette insertion portion (not shown) of the recording and/or reproducing apparatus, lock releasing portions of the lid opening means (not shown) are inserted through the recesses 14b into the tape withdrawing recess portion 9, urging the bosses 31 to move rearward. This causes the back lid 25 to rotate counter-clockwise and the front portion of the back lid 25 to incline in the forward direction as shown in FIG. 1B. Thus, the guided pins 30 move to the positions where the initial guide portions 34 meet the intermediate portions 35 of the guide grooves 33. Then, a lid opening force is applied to the front lid 13, whereby the front lid 13 rotates in the lid opening direction. In accordance with this rotation of the front lid 13, the two support members 23 rotate around the coaxial support pins 27 of the back lid 25. The guided pins 30 move through the intermediate portions 35 and the final guide portions 36 of the guide grooves 33 in the lid opening direction, ultimately reaching the lid opening position shown in FIG. 1C.

As the guide pins 30 are guided by the intermediate portions 35 of the guide grooves 33, the inclination of the back lid 25 relative to the front surface portion 14 of the front lid 13 is gradually increased. In contrast, as the guide pins 30 are guided by the final guide portions 36 of the guide grooves 33, the above-mentioned inclination is gradually decreased. When the back lid 25 reaches the lid opening position, the back lid 25 becomes substantially parallel to the front lid 13.

The front lid 13 and the back lid 25 are moved in the lid closing direction oppositely from the above-mentioned movement in the lid opening direction.

Since most portions of the back lid 25, except its upper end portion, are significantly spaced from the magnetic tape 7 before opening the lid, even if the back lid 25 has static electricity, there is no risk that the magnetic tape 7 will be attracted by the back lid 25 and moved therewith.

Further, the lower end portion 14c of the front lid 13, between the recesses 14b, is curved in such a manner as to be displaced rearward in the lower end thereof. A rotational locus $r_1$ (see FIG. 1A) of the place most distant from the rotation axis of the central portion of the front lid 13 is displaced rearward by a distance a as compared with a rotational locus $r_2$ provided when the lower end portion 14c is not curved. Thus, the cassette loading position of the recording and/or reproducing apparatus (not shown) can be approached by a head drum (not shown) of the recording and/or reproducing apparatus by the distance a, thereby allowing the mechanical deck to be compact in size.

A second embodiment of the tape cassette according to the present invention will be described next with reference to FIGS. 7-10B.

Throughout FIGS. 7-10B, a tape cassette of the second embodiment of the present invention is generally designated by reference numeral 37. As compared with the tape cassette 1 of the first embodiment of the present invention, the overall dimension, one portion of the structure of the back lid, the configuration of the guide groove and the locking device of the tape cassette 37 of the second embodiment are different. The configurations and functions of the rest of the tape cassette 37 of the second embodiment are substantially the same as those of the tape cassette 1 of the first embodiment of the present invention. Therefore, only different portions will be described hereafter and other portions will be identified by the same reference numbers as were used for the tape cassette 1 of the first embodiment. The common elements need not be redescribed.

Figure 9:
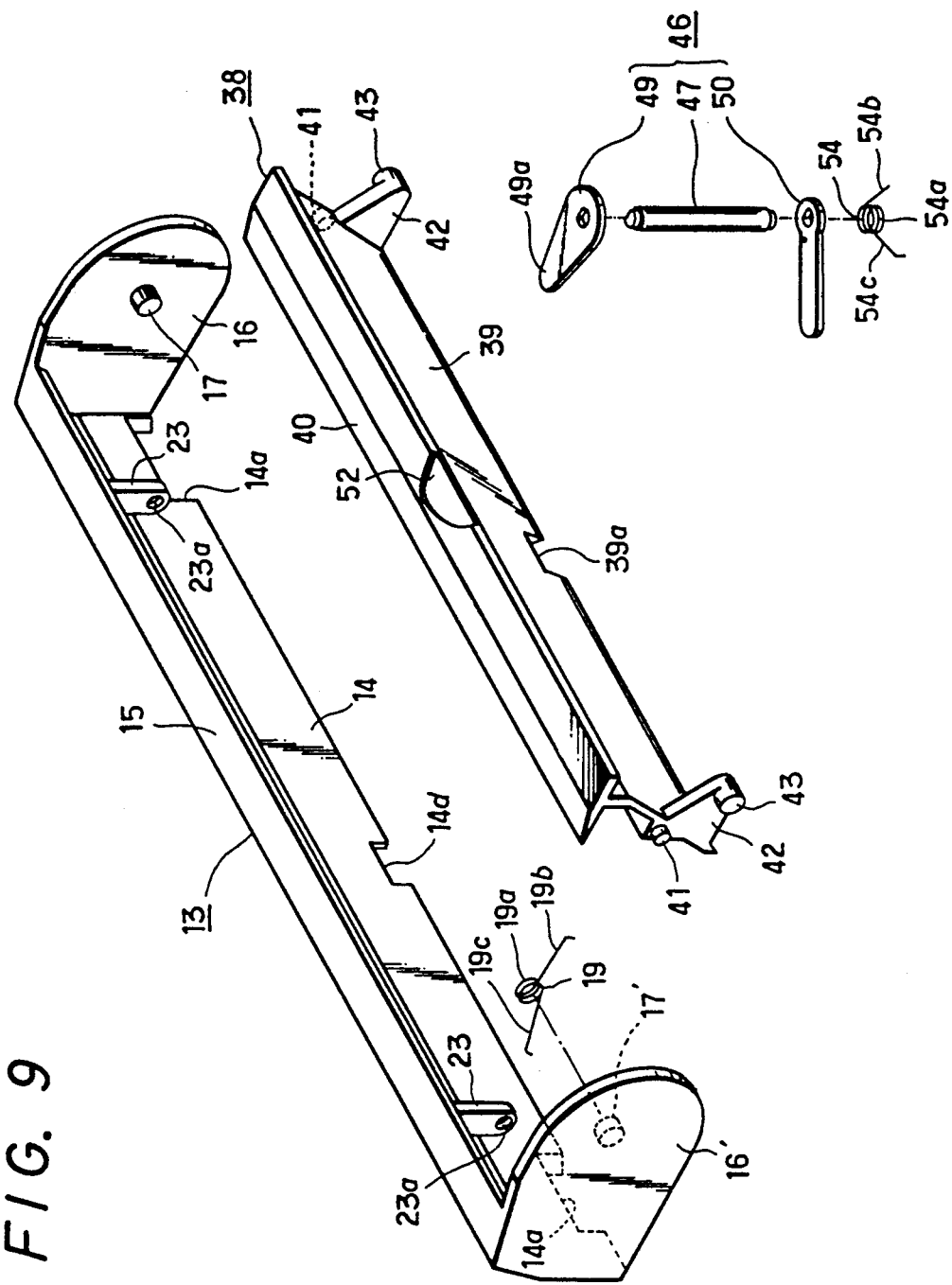

As illustrated in, for example, FIG. 9, a back lid 38 is comprised of a main portion 39 of rectangular plate-shaped configuration, long in the left to right direction, and an upper surface portion 40 of a band-plate-shaped configuration, long in the left to right direction. The upper surface portion 40 has a substantially intermediate portion in the width direction which is continuous with the upper end of the main portion 39. Support pins 41 protrude rearward from substantially the centers of the right and left end faces of the main portion 39. Arm portions 42 protrude rearward from the lower end portions of the right and left ends of the main portion 39. Guided pins 43 protrude from the top portions of the arm portions 42 in opposite directions which are bodily molded by a synthetic resin molding-process. The support pins 41 are inserted into the support apertures 23a of the support members 23 of the front lid 13, whereby the back lid 38 is rotatably supported by the front lid 13. Further, the guided pins 43 are slidably engaged with guide grooves 44 formed on the inner side surfaces 24a of the cassette casing 2 in the tape withdrawing recess portion 9, thereby being guided so as to move within the guide grooves 44.

Figure 10A:
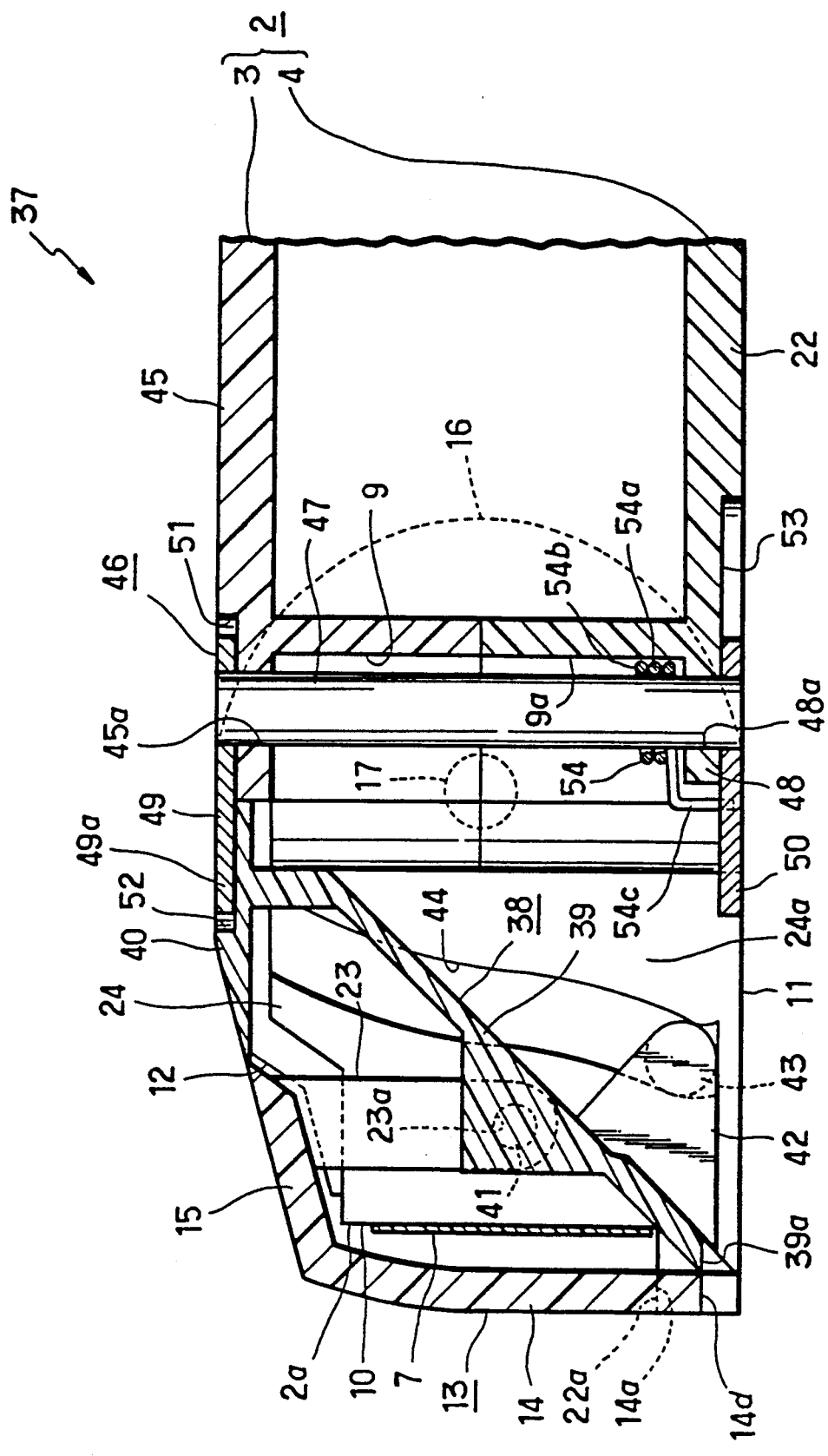
FIG. 10A is an enlarged, fragmentary, longitudinal cross-sectional view of the second embodiment of the tape cassette according to the present invention, in which the front and back lids are closed.
Figure 10B:
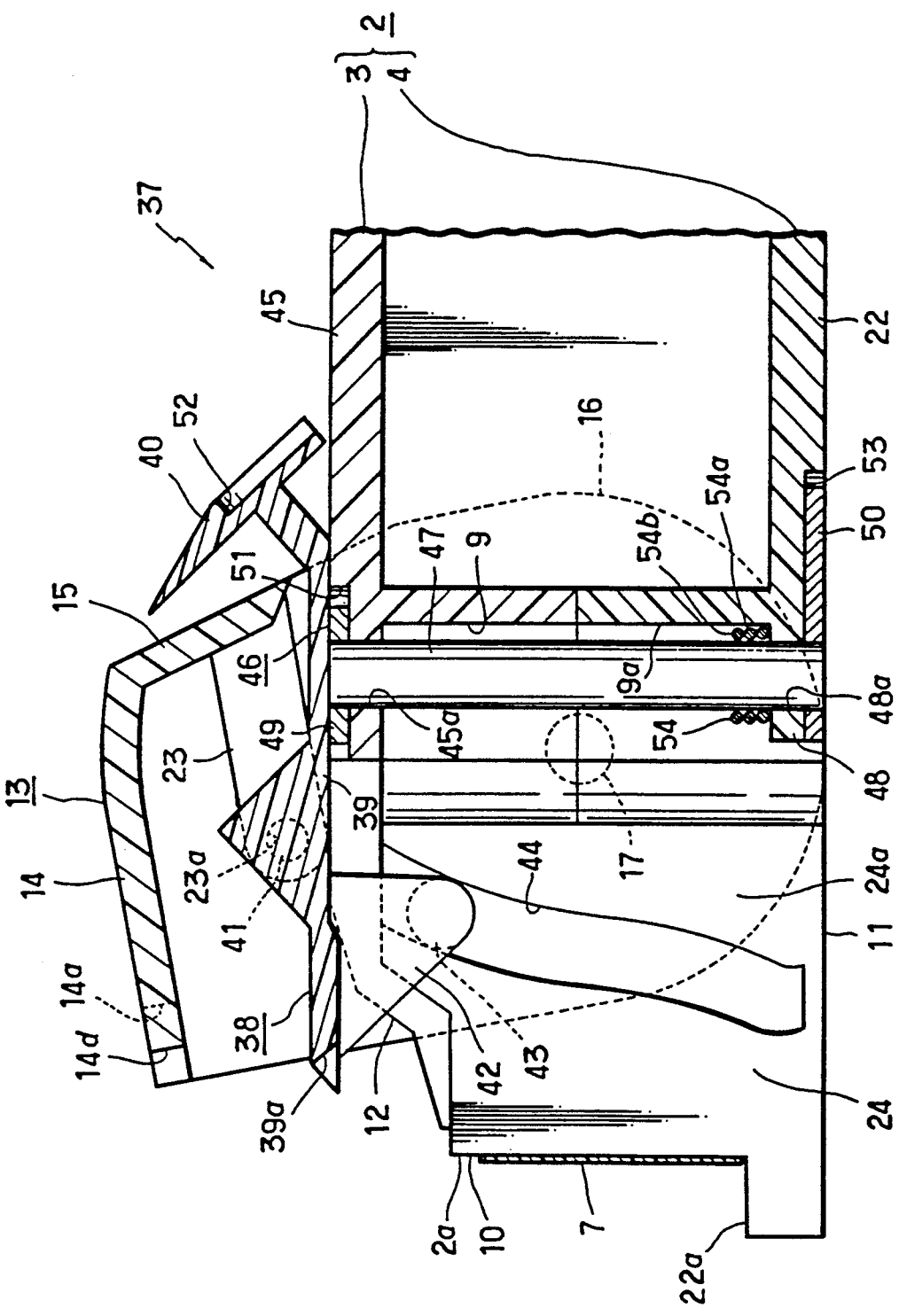

Accordingly, the back lid 38 moves between the lid closing position shown in FIG. 10A and the lid opening position shown in FIG. 10B in accordance with the rotation of the front lid 13. During the movement of the back lid 38, the attitude of the back lid 38 relative to the front lid 13 changes. In the lid closed condition, the main portion 39 of the back lid 38 opposes the front surface portion 14 of the front lid 13 under the condition that the main portion 39 is inclined rearward relative to the front surface portion 14 of the front lid 13. Also, the upper surface portion 40 of the back lid 38 is located so as to form one portion of a top plate portion 45 of the cassette casing 2. The upper surface portion 40 contacts the upper surface portion 15 of the front lid 13 from the rearward direction, whereby the front surface 10 and the upper surface 12 of the tape withdrawing recess portion 9 are closed and the magnetic tape 7 which extends along the front wall 2a of the cassette casing 2 is covered at its front and back sides and upper and lower sides by the front lid 13 and the back lid 38. Then, in the lid opened condition, the front wall 2a of the cassette casing 2 is open and the back lid 38 is located above the tape withdrawing recess portion 9.

As illustrated in FIG. 9, a locking member 46 is provided to lock the back lid 38 in the lid closed position. As will be described hereinbelow, this locking member 46 is comprised of a rotary shaft 47 rotatably supported by the cassette casing 2, an engaging member 49 secured to the upper end portion of the rotary shaft, and a pushed arm member 50 secured to the lower end portion of the rotary shaft 47 or the like. The above-mentioned engaging member 49 downwardly engages the upper surface portion 40 of the back lid 38 in the lid closing position, thus inhibiting the back lid 38 from moving in the lid opening direction.

As illustrated best in FIG. 10A, the upper end portion of the rotary shaft 47 is inserted into a support aperture 45a formed through the top plate portion 45 of the cassette casing 2. The aperture is located at a substantially central portion of the front end portion so as to oppose the tape withdrawing recess portion 9. Also, the lower end portion of the rotary shaft 47 is inserted into an aperture 48a of a bearing portion 48 which protrudes from a lower end portion of a back surface 9a of the tape withdrawing recess portion 9, whereby the rotary shaft 47 is rotatably supported by the cassette casing 2 about its axis.

Figure 7:
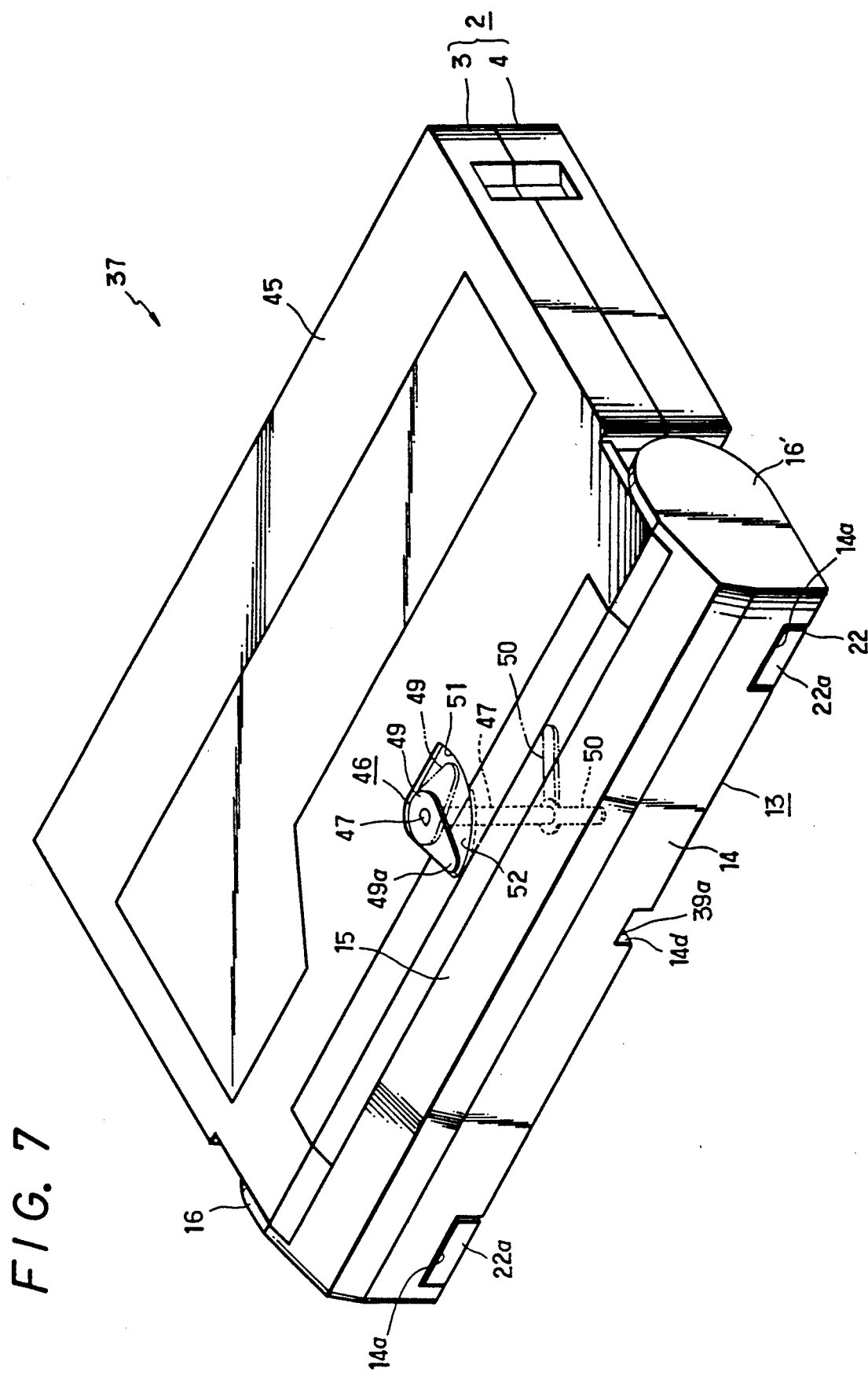
Figure 8:
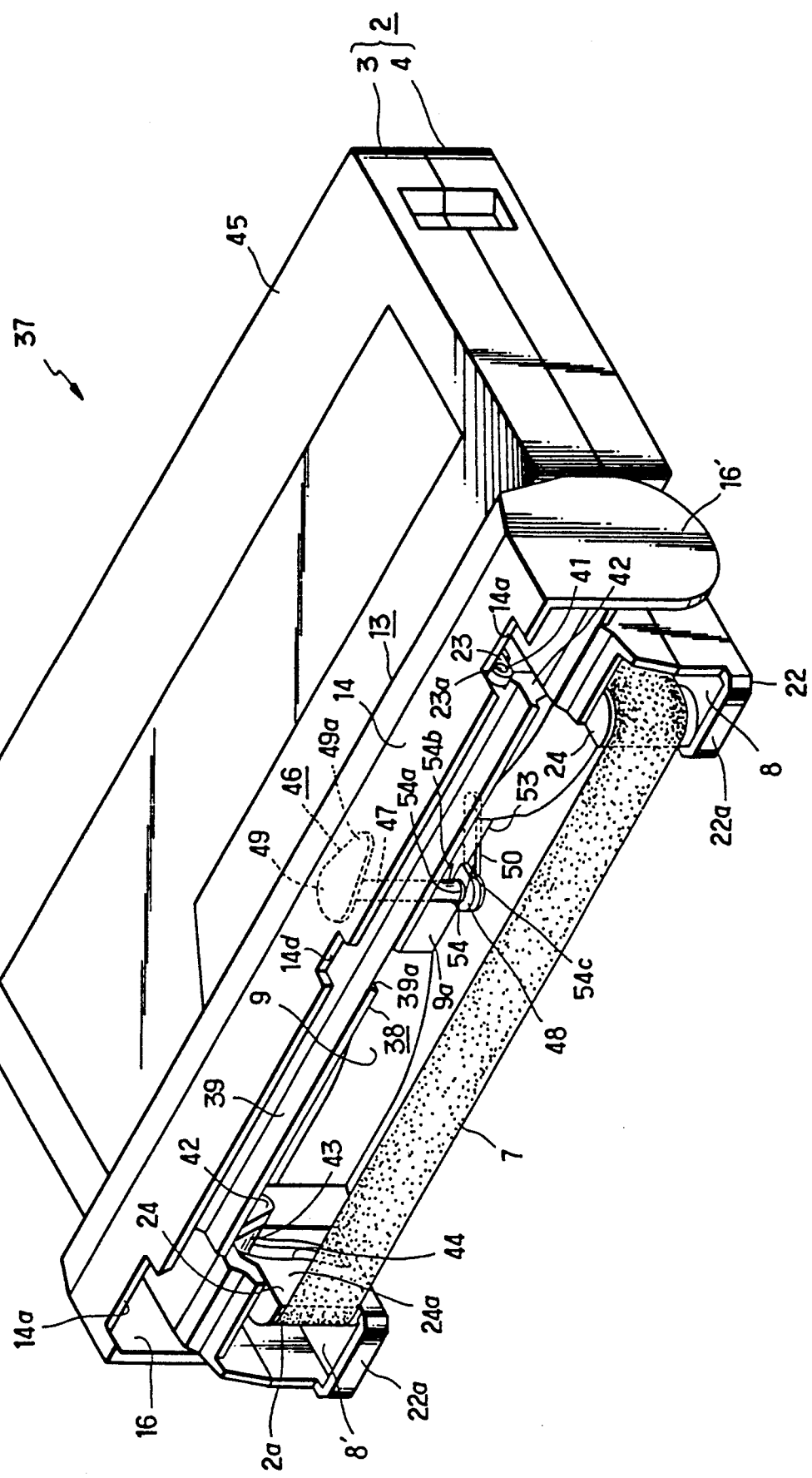

As shown in FIG. 7, a base end portion of the engaging member 49 is secured to the upper end portion of the rotary shaft 47. A base end portion of the pushed arm member 50 is secured to the lower end portion of the rotary shaft 47 with the result that the engaging member 49 and the pushed arm member 50 are formed as one body by way of the rotary shaft 47.

As shown in FIG. 7, a recess portion 51 of small depth is formed on the upper surface of the top plate portion 45 including the support aperture 45a. A recess portion 52 of small depth is formed on the upper surface portion 40 of the back lid 38 at a substantially central position relative to the left to right direction of the latter half portion of the back lid 38. When the back lid 38 is in the lid closed position, these two recess portions 51 and 52 contiguously form a recess portion of substantially arc-shaped configuration, wherein the engaging member 49 functions as a rivet as seen from above.

The engaging member 49 has a thickness which is substantially the same as the depths of the above-mentioned recess portions 51 and 52. The engaging member 49 is located within the two recess portions 51 and 52, such that it has approximately 90 degrees of rotational freedom. More precisely, the engaging member 49 can be moved between a locked position and a lock releasing position. In the locked position the longitudinal direction of the engaging member extends in substantially the front to back direction of the cassette, and the rotary end portion 49a is located within the recess portion 52a of the back lid 38 as shown by a full line in FIG. 7. The lock releasing position is reached by moving the rotary end portion 49a approximately 90 degrees in the counter-clockwise direction from the locked position as shown by phantom, two-dot chain, lines in FIG. 7. In the lock releasing position the whole engaging member 49 is located within the recess portion 51 of the top plate portion 45.

The engaging member 49 and the pushed arm portion 50 are displaced from each other by about 45 degrees relative to the rotary shaft axis so that, when the engaging member 49 reaches the locking position, the pushed arm portion 50 protrudes from the rotary shaft 47 in substantially the front right direction.

A recess portion 53 of small depth is formed in the front end portion of the lower surface of the bottom plate portion 22 of the cassette casing 2 to the right of the rotary shaft 47 as seen from the front direction. When the engaging member 49 moves to the lock releasing position, the pushed arm portion 50 is located within the recess portion 53.

Further, recesses 14d and 39a are respectively formed through the lower end portion of the front surface portion 14 of the front lid 13 and through the lower end portion of the main portion 39 of the back lid 38 at positions corresponding to the above-mentioned recess portion 53.

A spring coil portion 54a of a return spring 54 has a scissors-shaped spring configuration, and is engaged with the rotary shaft 47 near its lower end. One spring arm portion 54b of the return spring 54 is resiliently urged against a back surface 9a of the tape withdrawing recess portion 9. The other spring arm portion 54c engages the base end portion of the pushed arm portion 50, whereby the lock member 46 is always urged to rotate in the clockwise direction as seen from above.

Therefore, when the back lid 38 is in the lid closed position, the rotary end portion 49a of the engaging member 49 is located within the recess portion 52 of the back lid 38, whereby the back lid 38 is inhibited from moving in the lid opening direction. Further, since the back lid 38 is inhibited from moving in the lid opening direction, the front lid 13 is also inhibited from moving in the lid opening direction.

In this fashion, the front lid 13 and the back lid 38 are locked in their lid closed positions. Since the back lid 38, when closed, is locked at its intermediate portion in the left to right direction, this locking effect is also applied to the front lid 13. Since the front lid is coupled to the back lid 38, at its left and right side end portions, this results in increased mechanical strength of the front lid 13 to resist twisting forces when in the lid closed position. Thus, even when the front lid 13 is urged to move in the lid opening direction by a force applied to one of its side end portions, the risk that the front lid 13 will be deformed or displaced is minimized.

When the tape cassette 37 is inserted into the cassette insertion portion of the recording and/or reproducing apparatus (not shown), a lock releasing device (not shown) is inserted into the tape withdrawing recess portion 9 through the recess 14d of the front lid 13 and the recess 39a of the back lid 38. The lock releasing device then pushes the pushed arm portion 50 to rotate approximately ninety degrees, whereby the engaging member 49 moves to the lock releasing position. From this condition, the front lid 13 and the back lid 38 move towards the lid opened position.

When the tape cassette 37 is ejected from the recording and/or reproducing apparatus, the front lid 13 returns to the lid closed position by the torsion spring 19, and the back lid 38 also returns to the lid closed position in accordance therewith. When the back lid 38 returns to the lid closed position, the return spring 54 urges the lock member 46 to rotate in the clockwise direction, whereby the engaging member 49 moves to the locked position, resulting in the back lid 38 being locked.

As described above, the tape cassette of the present invention, in which one portion of the magnetic tape is withdrawn to the outside of the cassette casing so as to be extended along the front wall of the cassette casing between the tape exit portions formed at the two end portions of the front wall, is comprised of a front lid rotatably supported to the cassette casing so as to cover the whole area of the front wall of the cassette casing and the back lid rotatably supported by the front lid so as to cover a portion of the magnetic tape from the rear direction. When the tape cassette is not in use and the front and back lids are in their closed positions, a portion of the magnetic tape is covered from its front and back sides by the front lid and the back lid. The tape cassette of the present invention is characterized by the locking device which locks the back lid in the lid closed position when the tape cassette is not in use.

Therefore, according to the tape cassette of the present invention, the locking device which locks the back lid also acts on the front lid at the positions where the front lid and the back lid are coupled. The lids are coupled at centrally located positions displaced inward from the two end portions. Thus, the distance between the positions at which the front lid is locked and the side end portions is reduced, whereby the mechanical strength of the front lid to resist twisting forces applied to the side end portions is increased. Therefore, even when such force is applied thereto, the front lid can be prevented from being easily displaced in the lid opening direction. Further, the front lid is less easily deformed.

In the first embodiment of the present invention, the spring for urging the back lid to rotate and one portion of the guide groove for defining the movement locus of the back lid are utilized to lock the back lid in the lid closed position. Therefore, a special locking device is not needed, which simplifies the tape cassette structure.

Having described preferred embodiments of the invention with reference to the accompanying drawings, it is to be understood that the invention is not limited to those precise embodiments, and that various changes and modifications thereof may be produced therein by one skilled in the art without departing from the scope or spirit of the novel concepts of the invention as defined in the appended claims.

I claim:

1. A tape cassette of the type in which a tape is withdrawn to the outside of a cassette casing such that a tape portion having front and rear sides, extends along a tape withdrawing area between tape exit portions formed at two end portions of a front wall of the cassette casing, and including a front lid rotatably attached to the cassette casing so as to cover the whole area of the front wall of the cassette casing, and a back lid rotatably attached to the front lid so as to substantially cover the rear side of the tape portion, the front and back lids being mounted in the cassette for movement between an open position allowing access to the tape portion when the cassette is in use, and a closed position wherein the front and rear sides of the tape portion are substantially covered by the front and back lids when the tape cassette is not in use, the tape cassette being characterized by:

locking means for locking the back lid in the closed position when the tape cassette is not in use, the locking means comprising at least one guide pin mounted on the back lid and a corresponding guide groove in the cassette casing for receiving the guide pin, a lower end of the guide groove including a locking surface against which the guide pin is locked when the front and back lids are in the closed position.

2. The tape cassette according to claim 1, wherein the back lid includes a second guide pin and the cassette casing includes a second guide groove, including a second locking surface, against which the second guide pin is locked when the front and back lids are in the closed position.

3. The tape cassette according to claim 1, further comprising spring-biasing means for urging the back lid toward the locking direction.

4. The tape cassette according to claim 1, wherein the locking means includes means for locking the front and back lids together in their closed positions when the tape cassette is not in use.

5. The tape cassette according to claim 1, wherein the cassette casing is intended for use in a tape cassette recorder/player of the type which includes a lock releasing device for insertion into the cassette casing, the cassette casing includes a recess for receiving the lock releasing device, and the back lid includes one or more lock releasing bosses along one edge thereof for engagement with the lock releasing device, and wherein the locking means includes means connected to the back lid for unlocking it when the lock releasing bosses are engaged by the lock releasing device.

6. A tape cassette of the type which includes a pair of reels on which the tape is mounted and means for mounting the reels within the cassette for rotation about a pair of parallel axes of rotation and in which a tape is withdrawn to the outside of a cassette casing such that a tape portion having front and rear sides, extends along a tape withdrawing area between tape exit portions formed at two end portions of a front wall of the cassette casing, and including a front lid rotatably attached to the cassette casing so as to cover the whole area of the front wall of the cassette casing, and a back lid rotatably attached to the front lid so as to substantially cover the rear side of the tape portion, the front and back lids being mounted in the cassette for movement between an open position allowing access to the tape portion when the cassette is in use, and a closed position wherein the front and rear sides of the tape portion are substantially covered by the front and back lids when the tape cassette is not in use, the tape cassette being characterized by:

locking means, including a locking member, for locking the back lid, means for mounting the locking member in the cassette for rotation about an axis which is generally parallel to the axes of rotation of the tape reels for rotation between a lid locked position and a lid unlocked position, the locking member when rotated to the lid locked position being in engagement with the back lid to block it from being moved to its open position.

7. The tape cassette according to claim 6, wherein the cassette casing is intended for use in a tape player of the type which includes a lock releasing device for insertion into the cassette casing, and wherein the cassette casing includes a recess for receiving the lock releasing device which abuts against and rotates the locking member to its lid unlocked position, thereby unlocking the back lid.

8. The tape cassette according to claim 7, further comprising spring-biasing means for urging the locking member to rotate in the locking direction.

* * * * *